Patented Oct. 2, 1945

2,386,141

UNITED STATES PATENT OFFICE

2,386,141

PROCESS OF TREATING TEXTILE MATERIALS

Maurice Arthur Thorold Rogers, Blackley, Manchester, England, assignor to Imperial Chemical Industries Limited, a corporation of Great Britain No Drawing. Application August 2, 1939, Serial No. 288,059. In Great Britain August 2, 1938

11 Claims. (Cl. 8—116.3)

The present invention relates to the manufacture of new quaternary ammonium compounds and to their use in treating textile materials, especially for the purpose of conferring water-repellent properties thereon.

According to the invention we make new quaternary ammonium salts by causing a halogenomethyl compound of the formula

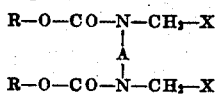

wherein R is an aliphatic radical of at least 7 carbon atoms, X is a halogen and A is a divalent organic radical, to react with an aliphatic or heterocyclic tertiary amine.

As will be seen from the formula, the halogenomethyl compounds which are used as starting materials are derivatives of the fatty alcohols ROH. They are, in fact, conveniently made by interaction of two molecular proportions of the chloroformic ester of the alcohol ROH with one molecular proportion of a diamine $NH_2$—A—$NH_2$, whereby a dicarbamate of formula

is obtained, followed by treatment of the said dicarbamate with formaldehyde (or a polymer thereof) and a hydrogen halide or a substance behaving as such under the conditions of the reaction (e. g. phosgene), or with a product of the interaction of formaldehyde and a hydrogen halide, namely a dihalogenodimethyl ether.

Then as suitable fatty alcohols for making the halogenomethyl compounds there may be mentioned, for example, octyl, decyl, dodecyl, myristyl, cetyl, octadecenyl, octadecyl and ceryl alcohols and mixtures of these and similar alcohols obtained by reduction of the acids of natural fats and oils e. g. coconut oil, palm kernel oil or wool fat, alcohols obtainable by reduction of the esters of montanic acid, alcohols obtainable by hydrolysis of the mixed sulphuric esters which are formed by sulphonation of polymerised lower olefines and also alcohols which are likewise esters such, for example, as β-hydroxyethyl stearate.

Thus as suitable halogenomethyl compounds to be used in the process of the invention there may be mentioned, for example, di-octadecyl N:N' - di - (chloromethyl) - ethylenedicarbamate, di-octadecyl N:N'-di-(chloromethyl)-hexamethylenedicarbamate, di-octadecyl N:N'-di-(chloromethyl) - p - phenylenedicarbamate, di-octadecyl N:N' - di - (chloromethyl) - m - phenylenedicarbamate, di-octadecyl N:N'-di-(chloromethyl)-o-phenylenedicarbamate, di-octadecyl N:N'-di-(chloromethyl)-1:5-naphthylenedicarbamate, di-octadecyl N:N' - di - (chloromethyl)-2-methoxy-1:4-phenylenedicarbamate, di-octadecyl N:N'-di-(chloromethyl)-2-chloro-1:4-phenylenedicarbamate, di-octadecyl N:N'-di-(chloromethyl)-6-methyl - 1:3 - phenylenedicarbamate, the di-(chloromethyl)-dicarbamates having the formulae respectively

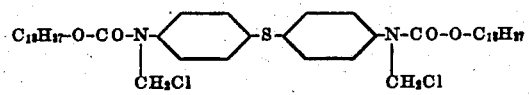

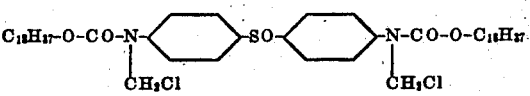

and

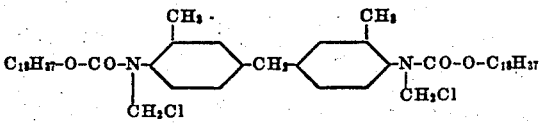

and also the corresponding di-(bromomethyl)-dicarbamates and the corresponding di-dodecyl, di-cetyl, and di-montanyl di-(chloromethyl)- and di-(bromomethyl)-dicarbamates. All the above di-(halogenomethyl)-dicarbamates and their analogues may be made by the general method already described.

As suitable aliphatic or heterocyclic tertiary amines to be combined with the di-(halogenomethyl)-dicarbamates there may be mentioned, for example, trimethylamine, triethylamine, N:N' - tetramethylethylenediamine, dimethylcyclohexylamine, diethylcyclohexylamine, N-methylpiperidine, pyridine and α-picoline.

In carrying the invention into practical effect the halogenomethyl compound and the tertiary amine are mixed, optionally in presence of a solvent or diluent. The reaction is exothermic and it is desirable in some cases to moderate its violence by using a large bulk of solvent or diluent or by applying external cooling means.

The new quaternary salts are white or pale coloured solids which are soluble in water, benzene, alcohol, chloroform and ethylene dichloride and sparingly soluble in ether and acetone. Their aqueous solutions are viscous and foam slightly on shaking but when they are boiled the foaming power is gradually lost and the quaternary salt is decomposed. When the quaternary salts themselves are heated above 100° C. they decompose, forming water-insoluble waxy substances.

By a further feature of the invention the new quaternary salts are applied to textile materials, which are of animal or vegetable origin or which are composed of regenerated cellulose or of cellulose esters or ethers, to give them properties of softness, or of softness and water-repellence, which are resistant to laundering or dry-cleaning treatments. This feature of the invention comprises impregnating the said textile materials with a solution or suspension of one or more of the said quaternary salts in water or a suitable organic liquid, and subsequently submitting the impregnated material to a short heat treatment at a temperature such that the quaternary salt undergoes decomposition.

The conditions for carrying out the impregnation vary according to the nature of the material to be treated, the nature and concentration of the impregnating fluid and the kind of finish desired. For convenience the compounds are usually applied from an aqueous medium, but if tightly woven fabrics are to be treated it is frequently advantageous to add to the bath a small proportion of alcohol or acetone to facilitate penetration of the fabric. It is also possible, though for many purposes undesirable on economic grounds, to use solutions in organic liquids such, for example, as benzene, methanol, ethanol, trichloroethylene, white spirit or mixtures of two or more such liquids. This method of working is advantageously used for the simultaneous dry-cleaning and reproofing of shower-proofed garments.

The concentration of the impregnating fluid to be used depends on the nature of the material to be treated and the kind of finish desired. In general it can be said that soft finishes which are only slightly water-repellent are obtained when the impregnating fluid contains about 0.05–0.2% of the treatment agent and highly water-repellent soft finishes are obtained when the concentration is about 0.5–3%. With tightly woven fabrics, rather stronger solutions are needed. It should be noted that these figures are based on the assumption that the impregnated material contains its own weight of the impregnating fluid; if it contains less, the concentration should be proportionately increased.

To prevent or minimise tendering when materials composed of cellulose or of cellulose esters or ethers are treated with a quaternary salt of a strong acid, the impregnating fluid should preferably contain also an alkaline substance or a substance which has an acid-binding action. Alternatively such substances may be applied to the material separately, either before or after the impregnation with the quaternary salt. Suitable substances are, for example, pyridine, hexamethylene tetramine and salts of weak acids with ammonia, alkali metals or alkaline earth metals, such as ammonium acetate, sodium acetate or borax.

There may also be added to the treatment bath other textile finishing agents, for example, agents which will give a fuller or stiffer handle to the treated materials such as aluminum acetate, carragheen moss, gum tragacanth, resins, waxes (in solution or suspension), aluminium stearate, or cellulose derivatives, for example, methyl, ethyl or glycol cellulose. Other water-repellent agents may likewise be added, particularly water-insoluble compounds closely related to the new quaternary salts, for example, the dialkyl dicarbamates from which the quaternary salts are derived and the products of their condensation with formaldehyde, for example, their methylol compounds. Many of these compounds appear to be dispersed in the treatment bath by the quaternary salt.

The treatment is carried out by padding or soaking the material in the impregnating fluid, removing surplus liquor by squeezing or hydro-extracting, when necessary drying at a low temperature and then heating for short time to a temperature sufficient to cause decomposition of the quaternary salt. To obtain the best results the material is finally given a light soap wash, preferably with the addition of a small proportion of ammonia or other alkali, to remove any undecomposed quaternary salt or buffer compounds, together with any water-soluble decomposition or reaction products.

The final heat treatment, conveniently to be called the "baking" treatment, is essential if the softness and water-repellence of the treated material are to be permanent, that is to resist laundering and dry-cleaning operations. Good softening and water-repellence may be obtained if the baking step is omitted, but they will not be permanent. The baking temperature should be between 90° and 200° C., preferably between 100° and 175° C. The time of baking depends on the temperature used and both depend, to some extent, on the nature of the material being treated. With thick or tightly woven fabrics a longer time of baking at a relatively low baking temperature should be used in order that the heating may be uniform, whereas fabrics of an open weave may safely be heated for a very short time at a higher temperature. By way of an example it can be said that for medium quality plain calico, suitable times and temperatures are 30 minutes at 100° C., 10 minutes at 130° C., or 1½ minutes at 150° C. The time of baking is preferably kept as short as possible to avoid tendering of the material.

When a hydroxylic solvent or carrying fluid is used, for example water or alcohol, it is desirable, when treating thick or tightly woven fabrics, to dry the impregnated material at a low temperature, for example, 30°–50° C., before subjecting it to the baking treatment. The temperature of drying is, however, of less importance than speed of drying and it is desirable that a brisk circulation of air around and, so far as is possible, through the fabric, is provided. The aim should be to give as little opportunity as possible for any interaction to take place between hot water or water vapour and the quaternary salt. Such interaction is detrimental to the final water-repellent finish. It may be noted, however, that, in respect of their stability to such possible decomposition by water during the process of application, the new quaternary salts are superior to those the use of which is described in British Specifications Nos. 466,817, 477,991, 493,920, 495,025, 497,856 and 498,287. With the new compounds (except when applied to thick or tightly woven fabrics), if there is provided a brisk circulation of air around and through the material, the drying step may be omitted, the impregnated material being heated forthwith at the baking temperature.

By a further feature of the invention the new quaternary salts may also be applied to textiles which are of vegetable origin or which are composed of regenerated cellulose in conjunction with compounds which are used in known manner to make such textiles crease-resistant. Textiles made crease-resistant by the known processes feel harsh to the touch and are stiffer than is desirable. It has been proposed to overcome this difficulty by the incorporation of softening agents but the known softening agents are unsuitable for this purpose because many of them are decomposed by the heat-treatment which is the final stage of the crease-proofing process and others, even if stable to the heat-treatment, are readily removed from the treated materials by laundering or dry-cleaning operations. By the process of the present invention there are provided textiles which are crease-resistant, water-repellent, soft and supple, readily falling into pleasing folds. Moreover, these properties are resistant to laundering and dry-cleaning operations.

The water-proofing and the crease-proofing processes both involve an impregnation of the material, usually from an aqueous bath, a drying at low temperature and a subsequent heating at a higher temperature and the two processes may be carried out simultaneously or separately and in either order.

Suitable crease-proofing processes are those in which there is formation of a synthetic resin in situ by impregnation of the fabric with a partly condensed resinous condensation product derived from an aldehyde or aldehyde-yielding substance and urea, thiourea or a urea or thiourea derivative or a phenol or an amino derivative of 1:3:5-triazine or a substitution product thereof (for example, melamine) under neutral, acid or alkaline conditions, or with the components required to form such a resinous condensation product, and a subsequent heat treatment to insolubilise the resin. Such processes are described, for example, in British Specifications Nos. 291,473, 291,474, 304,900, 431,703, 449,243, 458,877, 466,015 and 485,198.

In those processes wherein aldehyde condensation products of ureas or phenols are used, an acid or acid-yielding substance is used in the crease-proofing bath; if an aldehyde condensation product of an aminotriazine is used it can be omitted.

This feature of the invention therefore comprises the treatment of textiles which are of vegetable origin or which are composed of regenerated cellulose with solutions or suspensions of the new quaternary salts before or after or simultaneously with a treatment with a medium comprising resin-forming components or a partly-condensed resinous condensation product and, where necessary, an acid or acid-yielding substance, this process or processes being followed by drying, preferably at low temperature, and finally by a heat treatment at a temperature sufficient to cause decomposition of the quaternary salt and to insolubilise the resin.

The invention is illustrated but not limited by the following examples in which the parts are by weight.

*Example 1*

The starting out material for this example is made as follows:

35 parts (i. e. 1/20 mol) of di-octadecyl p-phenylene-dicarbamate of the formula $C_{18}H_{37}O—CO—NH—C_6H_4(p)—$
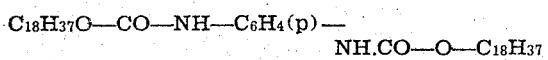
$NH.CO—O—C_{18}H_{37}$ (M. P. 146° C. made by condensing two molecular porportions of octadecyl chloroformate with one molecular proportion of p-phenylenediamine) and 6 parts of paraformaldehyde (i. e. 1/5 mol) are mixed with 500 parts of benzene. The mixture is stirred and heated. The temperature is kept at 60° C. while dry hydrogen chloride is passed in. As the reaction proceeds water separates out and the liquid becomes turbid. Eventually the liquid becomes clear again and the water separates from it and forms a separate layer. The lower aqueous layer is then run to waste. The benzene is distilled off from the upper layer, preferably under sub-atmospheric pressure. The residue left in the still is di-octadecyl N:N'-di-(chloromethyl)-p-phenylenedicarbamate of the formula:

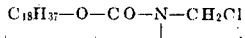

It is an oil, which on standing at room temperature, or on cooling to below room temperature, solidifies to a white waxy solid which fumes slightly in the air, and which is soluble in the cold in benzene, acetone, ether, ethyl acetate and chloroform.

This dichloromethyl compound, in liquid form, is mixed with 10 parts (i. e. 1/8 mol) of pyridine; there is evolution of heat, and the mixture rapidly sets solid. The solid is di-octadecyl N:N'-di-(chloropyridiniummethyl)-p-phenylenedicarbamate of the formula:

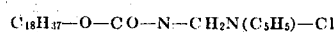
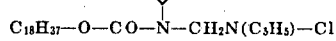

The product may be purified if necessary by dissolving it in cold chloroform, filtering the solution if necessary, and adding dry acetone, which brings about a precipitation. The white solid so obtained is filtered off and washed with dry acetone. It dissolves in water on warming forming clear viscous solutions which foam slightly on shaking. It is also soluble in benzene, chloroform and methyl and ethyl alcohols.

In a similar manner, starting in each case with 1 molecular proportion of the corresponding dicarbamic acid dialkyl ester, 2 molecular proportions of formaldehyde and 2.5 molecular proportions of pyridine, there may be made the following dipyridinium dichlorides, namely, di-octadecyl N:N' - di-(chloropyridiniummethyl) - m-phenylenedicarbamate, di-octadecyl N:N'-di-(chloropyridiniummethyl)-o-phenylene - dicarbamate, di-octadecyl N:N'-di-(chloropyridiniummethyl)-6-methyl-1:3 - phenylenedicarbamate, di-octadecyl N:N'-di-(chloropyridiniummethyl)-2 - chloro-1:4-phenylenedicarbamate, di-docecyl N:N' - di-(chloropyridiniummethyl)-p - phenylene-dicarbamate, di-octadecyl N:N'-di-(chloropyridiniummethyl) - ethylenedicarbamate, di-octadecyl N:N' - di-(chloropyridiniummethyl)-hexamethylenedicarbamate, and di-octadecyl N:N'-di-(chloropyridiniummethyl) - methylenedicarbamate.

*Example 2*

35 parts of di-octadecyl m-phenylenedicarbamate (M. P. 96° C., made by condensing two molecular proportions of octadecyl chloroformate with one molecular proportion of m-phenylenediamine) are converted into the dichloromethyl compound by the method described, in respect of the p-isomer, in Example 1.

The di-octadecyl N:N'-di-(chloromethyl)-m-phenylene-dicarbamate so obtained is dissolved in 150 parts of benzene. The solution is cooled to below 10° C. and stirred and 20 parts of triethylamine are gradually added during 1 hour. The cooling and stirring are continued for a further 16 hours. 600 parts of acetone are then added whereby the quaternary salt is precipitated. It is filtered off and dried.

Di - octadecyl N:N' - di - (triethylchloroammonium - methyl) -m-phenylenedicarbamate is thus obtained in the form of a white powder. It dissolves in water, forming clear viscous solutions which foam slightly on shaking. It is also soluble in benzene, ethanol and chloroform; it is insoluble in ether.

If in this process there are used, instead of the 35 parts of di-octadecyl m-phenylenedicarbamate, 33 parts of di-octadecyl ethylenedicarbamate, there is similarly obtained di-octadecyl N:N'-di-(triethylchloroammonium - methyl)-ethylenedicarbamate. This compound likewise is obtained as a white powder which dissolves in water, forming clear viscous solutions which foam slightly on shaking, and which is soluble also in benzene, chloroform and ethanol.

If in either of the above processes, instead of adding to the solution of the dichloromethyl compound 20 parts of triethylamine, 12 parts of trimethylamine are passed in and the product is then worked up as described, there is obtained di-octadecyl N:N'-di- (trimethylchloroammonium-methyl)-m-phenylenedicarbamate or di-octadecyl N:N' - di - (trimethylchloroammonium-methyl)-ethylenedicarbamate. These compounds have properties similar to those of their triethylammonium analogues.

Example 3

Di-octadecyl N:N'-di-(chloromethyl)-p-phenylenedicarbamate (made as described in Example 1 from 35 parts of di-octadecyl-p-phenylenedicarbamate) is dissolved in 100 parts of benzene. The solution is cooled to below 10° C. and stirred and 25 parts of dimethylcyclohexylamine are gradually added during 1½ hours. The stirring and cooling are continued for a further 16 hours. 150 parts of ethyl acetate are then added whereupon di-octadecyl N:N'-di-(cyclohexyldimethylchloroammonium - methyl)-p - phenylenedicarbamate separate out in the form of a viscous oil. This is washed by decantation with ethyl acetate and then with dry acetone. On prolonged standing in an evacuated vessel it solidifies and is then ground to a powder. It is a pale yellow, slightly hygroscopic solid which dissolves in water, forming solutions which foam slightly. It is also soluble in benzene, chloroform and trichloroethylene.

Example 4

Medium quality plain calico is padded in a solution of 20 parts of di-octadecyl N:N'-di-(triethylchloroammonium - methyl)-p-phenylenedicarbamate and 6 parts of crystalline sodium acetate in 1000 parts of water. The impregnated material is squeezed until it is double its initial weight and is then heated for 10–15 minutes in a brisk current of air at 150° C. Finally it is washed for 5 minutes at 40° C. in a solution of 1 part of soap and 0.25 part of strong ammonia solution (sp. gr. 0.880) in 1000 parts of water, well rinsed and dried.

Example 5

A viscose fabric is soaked in a solution of 1 part of di-octadecyl N:N'-di-(chloropyridinium-methyl)-ethylene-dicarbamate and 0.5 part of crystalline sodium acetate in 1000 parts of water. It is then squeezed until it is double its initial weight and dried at 60° C.

The fabric now has a soft handle and readily falls into pleasing folds.

If it is desired to make the finish resistant to washing and dry-cleaning, the dried fabric is heated for 2½ minutes at 150° C. Alternatively, the drying step is omitted, the impregnated fabric being heated forthwith for 10–15 minutes in a brisk current of air at 100° C.

Example 6

A cellulose acetate fabric is padded at 35° C. in a solution containing 20 parts of di-octadecyl N:N'-di-(trimethylchloroammonium-methyl)-p-phenylenedicarbamate and 6 parts of crystalline sodium acetate in 1000 parts of water. The impregnated material is squeezed until it is double its initial weight, dried at 50° C. and then heated for 2½ minutes at 140°.C. Finally it is washed for 5 minutes at 40° C. in a solution of 1 part of soap and 0.25 part of strong ammonia solution (sp. gr. 0.880) in 1000 parts of water, well rinsed and dried.

The fabric is now soft and highly water-repellent, these properties being resistant to laundering and dry-cleaning operations.

Example 7

The procedure is as in Example 4 except that a wool delaine material is treated instead of the calico. The woolen material is thereby made soft and highly water-repellent, these properties surviving laundering and dry-cleaning operations.

Example 8

A solution is made by dissolving 100 parts of urea in 200 parts of neutralised 40% aqueous formaldehyde solution to which is added 7.5 parts of concentrated ammonia solution (sp. gr. 0.880). The mixture is boiled for a few minutes and then rapidly cooled to room temperature. A cold aqueous solution of 6 parts of ammonium dihydrogen phosphate and 0.5 part of di-octadecyl N:N' - di - (triethylchloroammonium-methyl)-p-phenylenedicarbamate (or of di-octadecyl N:N'-di - (triethylchloroammonium - methyl) - ethylenedicarbamate) in 50 parts of water is now added and the whole is diluted to a total volume of 400 parts with cold water.

Spun viscose fabric is impregnated with this solution, squeezed and dried in a current of air at 40° C. and is then heated for 3 minutes at 140° C. Superfluous resin is removed by heating the fabric for 5 minutes at 50° C. in a solution containing 2 parts of soap and 1 part of sodium carbonate per 1000 parts of water. The fabric is then rinsed and dried.

The fabric is now soft and highly resistant to creasing. These properties survive laundering and dry-cleaning operations.

Example 9

100 parts of urea are dissolved in 200 parts of a neutralised 40% aqueous formaldehyde solution and 7.5 parts of ammonia (sp. gr. 0.880) are added. The mixture is boiled for a few minutes and then rapidly cooled to room temperature. 6 parts of ammonium dihydrogen phosphate dissolved in 50 parts of cold water are added and the whole is diluted with cold water to a total volume of 400 parts.

Spun viscose is impregnated with this solution, squeezed until it is double its initial weight, dried in a current of air at 40° C. and then heated for 3 minutes at 140° C. The so-treated fabric is then padded in a solution of 2 parts of either of the diquaternary salts specified in Example 8 and 0.6 part of crystalline sodium acetate per 100 parts of water, squeezed until it is double its dry weight, dried in a current of air at 40–50° C. and heated for 3 minutes at 140° C. Finally the material is washed for 5 minutes at 40° C. in a solution of 1 part of soap and 0.25 part of ammonia solution (sp. gr. 0.880) per 1000 parts of water, well rinsed and dried.

The fabric is now soft, crease-resistant and water-repellent. These properties are not destroyed by laundering or dry cleaning operations.

*Example 10*

Viscose crepe fabric is impregnated at 50° C. with a solution of 20 parts of either of the diquaternary salts specified in Example 8 and 6 parts of crystalline sodium acetate in 1000 parts of water, squeezed till it is double its initial weight and then dried in a current of air at 50° C. The fabric is then impregnated with a solution containing urea, formaldehyde, ammonia and ammonium dihydrogen phosphate prepared as described in Example 9, squeezed until it is double its dry weight, dried at 50–60° C. and then heated for 3 minutes at 140° C. Finally the fabric is washed for 5 minutes at 50° C. in a solution of soap and 1 part of sodium carbonate per 1000 parts of water, well rinsed in warm water and dried.

The fabric is now soft, water-repellent and crease-resistant. These properties are not destroyed by laundering or dry cleaning treatments.

*Example 11*

As Example 8, but in place of either of the diquaternary salts there specified there are used 8 parts of either of the corresponding pyridinium salts or of either of the corresponding trimethylammonium salts.

Mercerised cotton fabric, impregnated, dried and treated as in Example 8, possesses a high degree of crease-resistance and water-repellency. These properties are resistant to soap washing and to dry cleaning treatments.

I claim:

1. Process for conferring upon textile material the properties of softness and water-repellency, which comprises impregnating said material to an amount of not less than 0.5% by weight of the material, with a quaternary ammonium salt of the formula

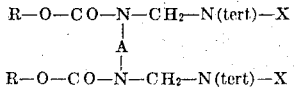

wherein R stands for an aliphatic hydrocarbon radical of at least 7 carbon atoms, X is halogen, A is a divalent organic radical selected from the group consisting of aliphatic and aromatic radicals free of substituents which are reactive toward formaldehyde, and N(tert) stands for a tertiary amine selected from the group consisting of aliphatic and heterocyclic tertiary amines, and subsequently submitting the impregnated material to a heat treatment in the absence of moisture at a temperature between 90° and 200° C. for a period of time sufficient to bring about chemical action as evidenced by decomposition of said quaternary ammonium salt.

2. Process for conferring upon textile material the properties of softness and water-repellency, which comprises impregnating said material with an aqueous bath containing, from 0.5 to 3% of its weight, a quaternary ammonium salt of the formula

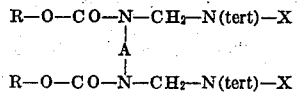

wherein R stands for an aliphatic hydrocarbon radical of at least 7 carbon atoms, X is a halogen, A is a divalent organic radical selected from the group consisting of aliphatic and aromatic radicals free of substituents which are reactive toward formaldehyde, and N(tert) stands for a tertiary amine selected from the group consisting of aliphatic and heterocyclic tertiary amines; then drying the material and subjecting the same to a heat treatment at a temperature between 100 and 175° C. for a period of time ranging from 1½ minutes for the higher temperatures to about 30 minutes for the lower temperatures.

3. A process of treating textile materials for the purpose of modifying the physical characteristics thereof, which comprises impregnating the material with a quaternary ammonium compound of the general formula

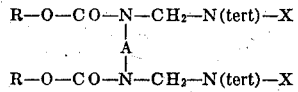

wherein R is an aliphatic radical of at least 7 carbon atoms, X is a halogen, A is an alkylene radical and N(tert) stands for a tertiary amine selected from the group consisting of aliphatic and heterocylic tertiary amines, and subsequently submitting the impregnated material to a dry heat treatment at a temperature between 100 and 140° C.

4. In a process of treating textile materials for the purpose of modifying the physical characteristics thereof, the steps consisting of impregnating the material with a quaternary ammonium compound of the general formula

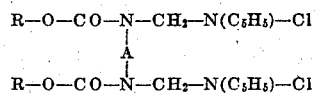

wherein R is an aliphatic radical of at least 7 carbon atoms, A is an alkylene radical and N(C₅H₅) stands for the pyridine radical, and subsequently submitting the impregnated material to a dry heat treatment at a temperature between 100 and 140° C.

5. Textile material resulting from the treatment defined in claim 3, and being characterized by soft feel and water-repellent qualities.

6. Textile material resulting from the treatment defined in claim 4, and being characterized by soft feel and water-repellent qualities.

7. Process for conferring upon textile material the properties of softness and water-repellency, which comprises impregnating said material with di-octadecyl N:N-di-(N' - chloro - pyridinomethyl)-p-phenylene dicarbamate to an amount from 0.5 to 3% by weight of the textile material, and then submitting the impregnated material to a heat treatment in the absence of moisture at a temperature between 100° and 175° C.

8. Process for conferring upon textile material the properties of softness and water-repellency, which comprises impregnating said material with di-octadecyl N:N - di - (N'-chloro-pyridinomethyl)-ethylene dicarbamate to an amount from 0.5% to 3% by weight of the textile material, and then submitting the impregnated material to a heat treatment in the absence of moisture at a temperature between 100° and 175° C.

9. Textile material having the properties of softness and water-repellence and being the product of a process as defined in claim 1.

10. Textile material having the properties of softness and water-repellence and being the product of a process as defined in claim 7.

11. Textile material having the properties of softness and water-repellence and being the product of a process as defined in claim 8.

MAURICE ARTHUR THOROLD ROGERS.